Dec. 22, 1936.    H. O. HEDGES    2,064,913
INTERNAL COMBUSTION ENGINE
Filed May 14, 1934    3 Sheets-Sheet 3

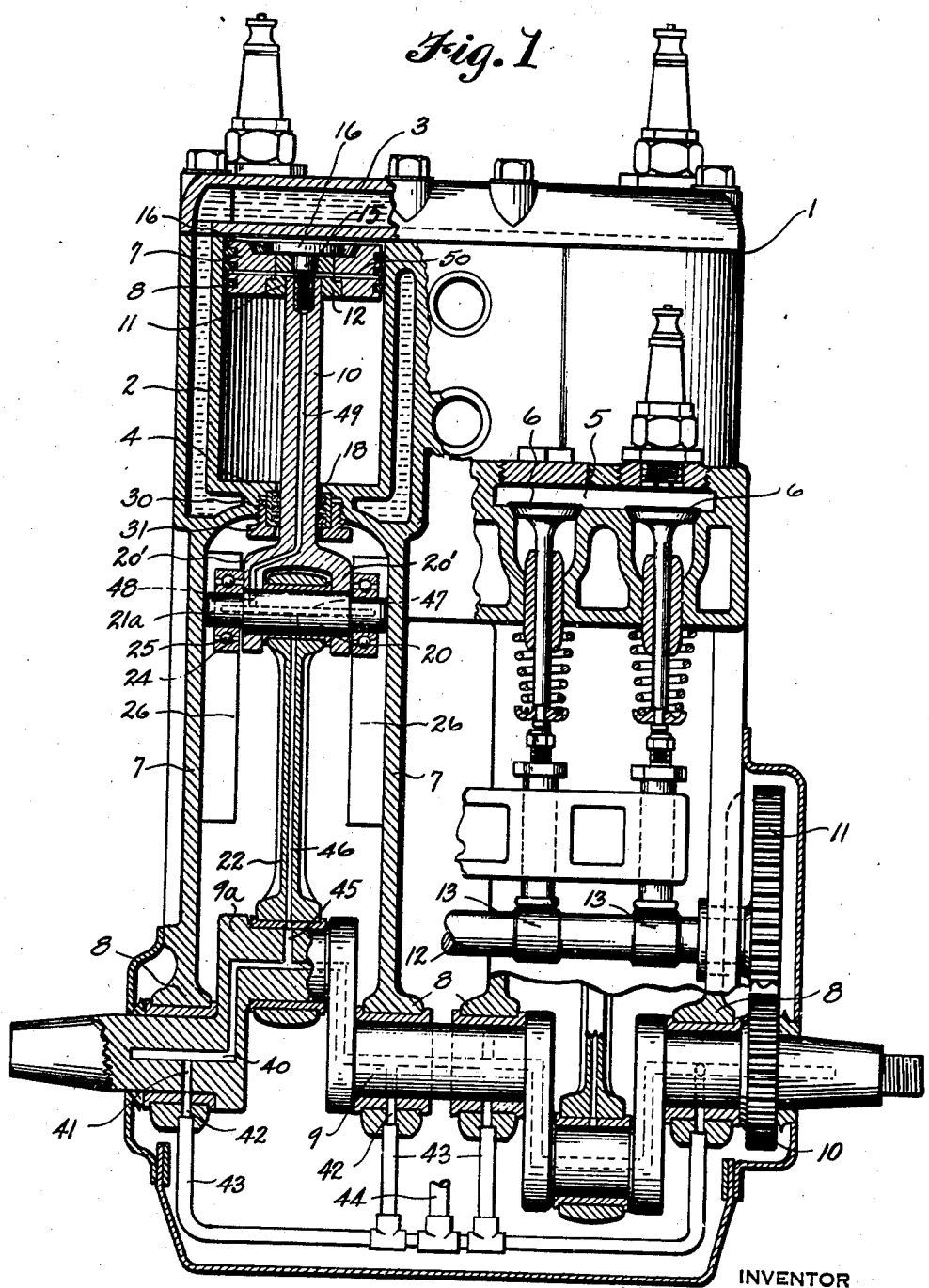

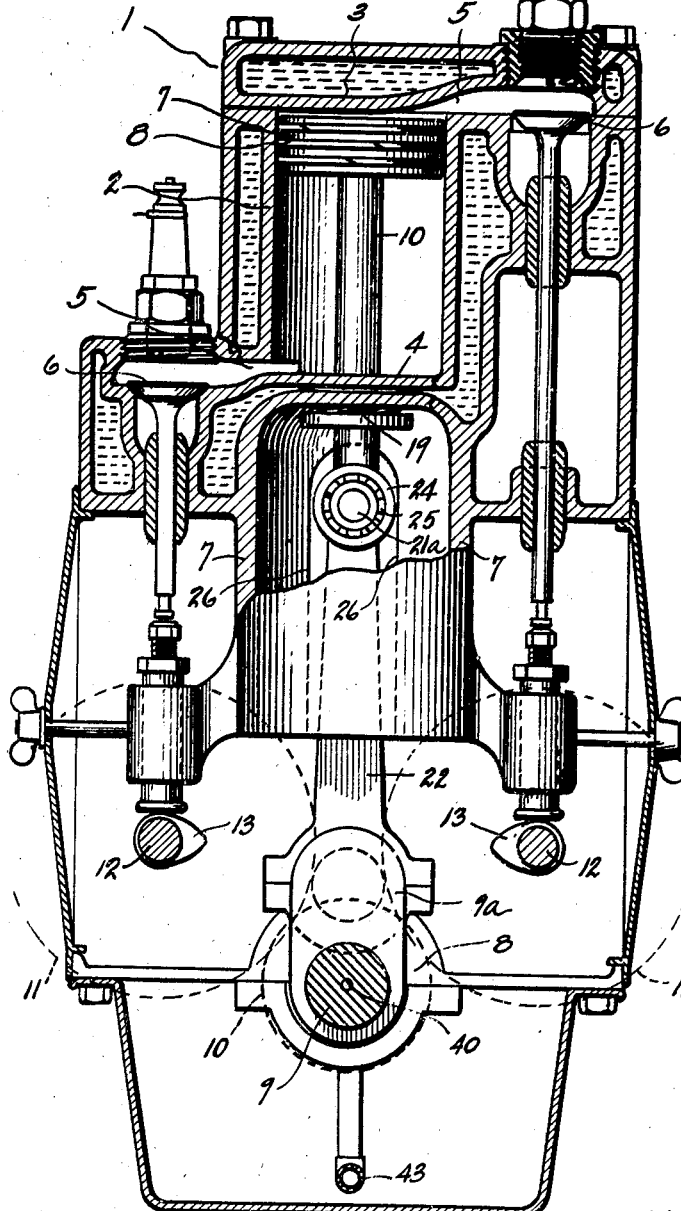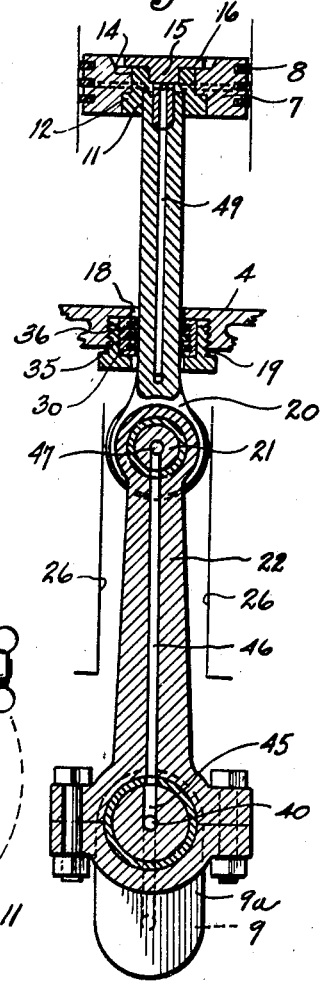

INVENTOR
HARRY O. HEDGES
BY
Cook + Robinson
ATTORNEY

Patented Dec. 22, 1936

2,064,913

UNITED STATES PATENT OFFICE 2,064,913

INTERNAL COMBUSTION ENGINE

Harry O. Hedges, Seattle, Wash., assignor to Hedges Motor Company, Seattle, Wash., a corporation of Washington Application May 14, 1934, Serial No. 725,490

2 Claims. (Cl. 123—63)

This invention relates to improvements in internal combustion engines and more particularly to engines having reciprocating pistons, each operating in a double acting cylinder; that is, a cylinder equipped for application of power impulses alternately at opposite sides of the piston. The invention further relates to engines of the character above stated, designed for operation on the four stroke cycle principle and in which engine each piston is connected to the crank shaft through the mediacy of a piston rod and a connecting rod; the former being extended reciprocally through a sealed opening in an end wall of the cylinder, and pivotally attached at its outer end to the connecting rod which, in turn, has driving connection with a throw of the crank shaft.

One of the objects of the present invention is to provide an improved cross head bearing and guideways therefor whereby the application of power impulses from the piston rod to the connecting rod, and vice versa, will reduce the friction due to lateral application of pressure against the guide and not cause lateral application of pressure against the piston, piston rod or rod packing nor will it cause any uneven wear on the cylinder walls.

Another object of the invention is to provide a cross head embodying rollers at its ends that track between parallel guide surfaces spaced apart a distance slightly greater than the diameter of the rollers, thereby to provide a lateral movement of the cross head for clearance that prevents frictional contact of the rollers with the guide surface at one side while moving in rolling contact with the surface at the other side.

It is also an object of the invention to provide an improved form of piston rod sealing which accommodates itself to that slight lateral movement of the cross head but which, at all times, maintains an effective, pressure tight joint about the rod.

It is also an object of this invention to provide the various moving parts with distributing channels through which there may be a forced application of lubricant to the piston and cylinder walls and to the piston rod and connecting rod bearings.

Another object is to so arrange the cross head assembly and piston rod sealing with associated parts that each functionally co-acts with the other in the operation of the engine.

Other objects of the invention reside in the details of construction and in the combination of the various parts and in their mode of operation, as will hereinafter be fully described.

In accomplishing the various objects of the invention, I have provided the improved details of construction, the preferred forms of which are illustrated in the accompanying drawings, wherein—

Fig. 1 is a view partly in side elevation and partly in vertical section, of an engine embodying the present invention.

Fig. 2 is a cross sectional view of the engine.

Fig. 3 is a sectional detail of a piston and parts by means of which the piston is connected with the crank shaft.

Figure 4:
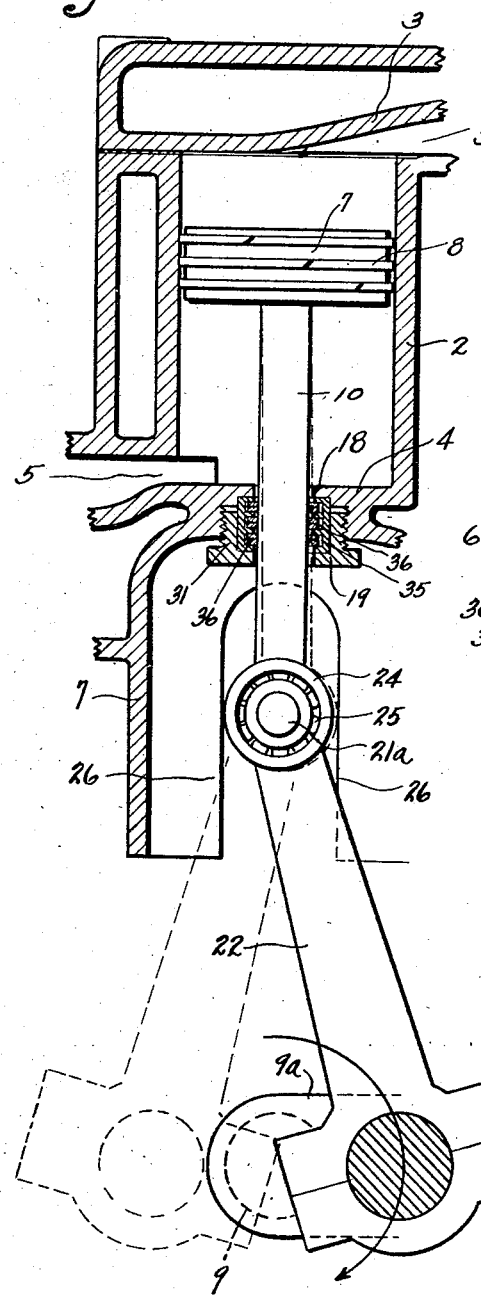
Fig. 4 is a sectional detail diagrammatically illustrating the lateral movement of the piston rod and cross head by reason of clearance provided for the cross head rollers.
Figure 6:
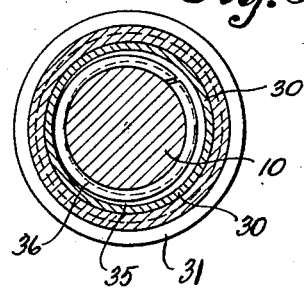
Fig. 6 is a cross section on line 6—6 in Fig. 5.

Before going into a detailed description of the present construction, it will here be stated that applicant is aware of various types of reciprocating engines in which cross heads are employed in guideways for guiding travel of the piston rod and for sustaining the lateral thrust of the connecting rod by reason of the rotary motion of the crank shaft. In many arrangements of the prior art, cross heads have been employed and in one to my knowledge the cross head embodies rollers arranged to track between parallel guideways which are so spaced that they provide lateral clearance whereby frictional contact of the rollers with one surface is avoided while they are moving in rolling contact with the other, but to my knowledge, no provision has been made in any instance to permit this lateral movement and at the same time maintain a tightly sealed joint about the piston rod where it passes through the cylinder end wall. The efficiency and desirability for the double acting piston type of engine is dependent on the maintenance of an effectively sealed joint about the piston rod and this is not possible with the various kinds of packing devices disclosed in the prior art, which receive frictional pressure and lateral thrust of the connecting rod incident to lateral movements.

Referring more in detail to the drawings—

I designates, in its entirety, an internal combustion engine embodying improvements made in accordance with details of the present invention. The engine is one designed to operate on the four stroke cycle principle and it includes a vertically disposed cylinder 2 that is closed at its upper end by a cylinder head 3 and at its lower end by an integral wall 4. The cylinder block and head are water jacketed in the usual manner for cooling purposes and at opposite ends of the cylinder are passages 5—5 for the intaking and exhaustion of fuel charges under the control of valves 6 as in the usual types of engines.

Cast integrally with the cylinder block and extending downwardly from its lower end, are enclosed cross head housings 7 at the lower ends of which are bearings 8 in which the crank shaft 9 for transmission of power is revolubly mounted. Fixed on the crank shaft is a gear wheel 10 that drives two gear wheels 11—11 fixed, respectively, on cam shafts 12—12 that extend parallel with and at opposite sides of the crank shaft. These cam shafts are equipped with cams 13 which operate in the usual manner to actuate the valves 6 between open and closed positions; it being understood that the valves also have the usual or any desirable mounting and actuating devices which are acted on by the cams in proper timing by reason of a synchronized rotation of the cam shafts with respect to each other and with the crank shaft by reason of the geared connections.

Reciprocally contained in the cylinder 2 is a disk type piston 7 of slightly lesser diameter than the cylinder and equipped with a plurality of sealing rings 8 of a yieldable character that permit of the slight movement of the piston that is incident to the lateral movements of the piston rod.

Connected centrally with the piston is the piston rod 10. As seen best in Fig. 1, the rod is fitted at its upper end in a downwardly opening socket 11 in a shouldered nut 12 that is applied to a central opening 14 in the piston from the underside thereof and a bolt 15 is extended through the nut and is axially threaded into the upper end of the rod from the top side of the piston. The bolt has a large, flat head 16 which overlaps the piston about the nut and co-acts with the nut in holding the rod and piston securely connected.

The piston rod extends reciprocally through a central opening 18 in the lower end wall 4 of the cylinder, through a packing gland 19 presently described in detail, and at its lower end is formed with a yoke 20, the spaced arms 20'—20' of which mount a cross head wrist pin 21 whereby pivotal connection is made with the upper end of a connecting rod 22 which, at its lower end, is operatively connected in the usual manner with a throw 9a of the crank shaft 9.

The cross head pin 21 extends perpendicularly with respect to the axial line of the piston rod and at its ends has portions 21a of reduced diameter on which rollers 24 are mounted through the mediacy of ball bearings 25. The rollers are of the same diameter and each is located to track between guideways formed by parallel rails 26—26 cast on the opposite walls of the cross head housing 7. The inner surfaces of the rails 26 are perfectly smooth and flat and form surfaces on which the rollers may move in rolling contact thus to freely support the piston rod against all the lateral thrust or pull of the connecting rod.

As will be observed by reference to Figs. 2 and 4, the contact surfaces of the cross head guide rails are parallel and are equally spaced at opposite sides of a plane axially through the cylinder and crank shaft. The spacing of these surfaces also is just slightly more than the diameter of the rollers, thereby providing a slight clearance between the rollers and surfaces at one side thereof while in rolling contact with the surfaces at the other side.

The piston rod sealing, as disclosed best in Figs. 4 to 7, comprises a cylindrical cage made up of two semi-cylindrical housings 30—30, removably fitted within a cylindrical bushing nut 31 that is threaded upwardly into the cylinder head opening 18 through which the rod reciprocates. The upper end of the cage seats firmly against a shoulder 32 and is held securely by tightening the bushing against its lower end. The opening 18 in the cylinder head, the cage 30 and the bushing 31 are all exactly coaxial of the cylinder, and provide an opening for the piston rod which is sufficiently greater in diameter than the rod diameter to permit the lateral movement of the rod provided for by the clearance in the cross head arrangement.

The cage is formed internally with a plurality of annular inwardly facing grooves 35 in which split packing rings 36 are fitted. These rings tightly fit the piston rod but are of lesser outside diameter than the overall diameter of the annular grooves 35 of the cage, thereby providing for that lateral movement of the rings in the cage that is required for the lateral play of the piston rod incident to lateral movements of the cross head. The rings 36 at all times maintain a tightly sealed joint about the rod and also between the rings and cage regardless of the lateral shifting.

Figure 7:
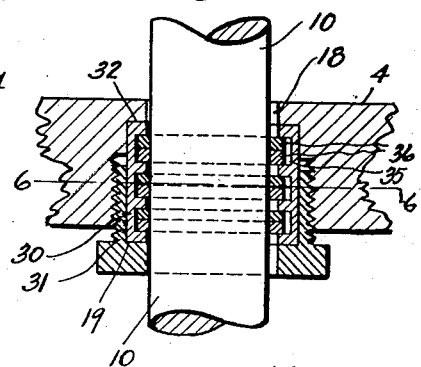
Fig. 7 is a perspective view of the sealing rings and the two part cage.
Figure 5:
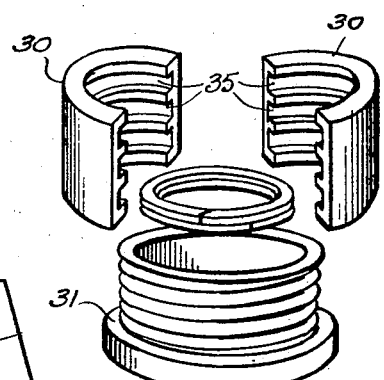
Fig. 5 is a sectional view of the piston rod sealing.

These rings of the sealing assembly may be easily and readily removed and replaced by unthreading the bushing 31, then unseating the cage 30 therefrom to permit separation of its two half sections as in Fig. 7. The rings are then slipped from or onto the rod after it has been disconnected from the piston.

To effectively apply lubricating oil to the surfaces of moving parts, I have provided an oil channel 40 lengthwise within the crank shaft and have provided lateral channels 41 leading radially therefrom to the various supporting bearings. These lateral channels are adapted to register during rotation of the shaft with ports 42 in the bearings with which oil supply pipes 43 are connected. The oil pipes have a supply connection, as at 44, which may be supplied by connection with a pump or other suitable means, not shown, whereby oil will be forcibly delivered into the system of channels.

Leading from the crank shaft channel 40 at the point of connection of each connecting rod, is a channel 45 through which oil will be fed to a channel 46 lengthwise of the connecting rod and communicating with a central channel 47 in the cross head wrist pin 20. This latter channel has a radial outlet 48 which is arranged for registration with a longitudinal channel 49 in the piston rod communicating at its upper end with a plurality of radial channels 50 leading to the surface of the piston and through which lubricant will be fed to the cylinder and piston walls.

With the engine constructed as above described, it is quite obvious that on downward movement of the piston under influence of a fuel charge exploded in the upper end of the cylinder, and rotation of the crank shaft in the direction designated by the arrow in Fig. 4, the thrust of the connecting rod against the cross head will be partly toward the left hand side. This will cause the cross head to be pushed to the left and the cross head rollers to travel in rolling contact with the guide surfaces at that side only. On the upstroke of the piston for scavenging the burner charge, the piston is pushed by the connecting rod and this shifts the cross head bearing and piston rod laterally to the opposite side, as indicated in dotted lines in Fig. 4, and the cross head rollers then have rolling contact with the guide surface at that side only. This upstroke is the intake or suction stroke for the lower end of the cylinder. Then as the piston is pulled down by the connecting rod to compress the charge intaken in the lower end of the cylinder and to draw in a charge at the upper end, the cross head bearings still retain their rolling contact with the guide surface at the right hand side, but on the next up stroke under the driving action of the piston, it shifts to the left.

With each lateral shifting of the cross head, the piston rod shifts accordingly in the sealing 19 and also the piston moves very slightly in accordance with the piston rod movement laterally, but at all times the rings effectively seal the opening through which the rod passes without any binding action; this being possible by reason of the sealing rings 36 having a certain amount of clearance about them in the cage channels 35.

Such engines may be made with one or a plurality of cylinders but it is preferred that they have two, or a multiple of two cylinders for most satisfactory results. Also, they may be made in various sizes, and for various purposes and may vary in the proportion of parts without departing from the spirit of the invention.

In the present construction there is a functional co-action existing between the sealing and cross head. The former maintains a tightly sealed connection at all times. The latter prevents lateral thrust in the piston and piston rod yet permits of a certain lateral movement necessary for clearance of the cross head rollers whereby friction is avoided. Without lateral play in the cross head, the desirability for the rollers would be nullified and without this particular character of sealing the lateral movements would result in ineffective sealing of the cylinder and difficulty of operation.

Having thus described my invention, what I claim as new therein and desire to secure by Letters Patent is—

1. In an engine, a power cylinder having an end wall opening, a piston reciprocally contained in the cylinder having a piston rod extended through the said end wall opening, a crank shaft, a connecting rod operatively connected with a throw of the crank shaft and with the extended end of the piston rod, a guideway comprising parallel guide surfaces, a cross head on the piston rod comprising a roller tracking in the guideway with lateral clearance whereby frictional contact with the surface at one side is avoided while the roller is in rolling contact with the surface at the other side, a connecting rod operatively joining the cross head and crank shaft and a piston rod sealing means fitted in the cylinder end wall opening including means to allow lateral movement therein permitting it to accommodate itself, without leakage, to lateral movements of the rod permitted by clearance between the cross head roller and guide surfaces.

2. In an engine, a power cylinder having an end wall opening, a piston reciprocally contained in the cylinder and having a piston rod extended through the said opening and beyond the end wall, a crank shaft, a connecting rod operatively connected at one end with a throw of the crank shaft, a pivot pin operatively connecting the other end of the connecting rod with the outer end of the piston rod, guideways at opposite sides of the piston rod parallel with the axial line of the cylinder; each guideway comprising parallel guide surfaces, rollers mounted on the ends of the pin and tracking in said guideways with slight clearance between the guide surface, and a piston rod sealing applied to the cylinder end wall opening and comprising sealing rings fitted to the rod and a casing formed with annular grooves containing said rings with clearance to accommodate lateral movements of the rod provided for in the cross head roller clearance.

HARRY O. HEDGES.